United States Patent [19]

Burroughs et al.

[11] 3,854,320
[45] Dec. 17, 1974

[54] QUIESCENT BREATH TESTING SYSTEM

[75] Inventors: James E. Burroughs, Mt. Prospect; John W. Seibert, Aurora; Joseph P. Hoppesch, Schaumburg, all of Ill.

[73] Assignee: Borg-Warner Corporation, Chicago, Ill.

[22] Filed: Dec. 11, 1972

[21] Appl. No.: 313,890

[52] U.S. Cl. ............................ 73/23, 23/254 R
[51] Int. Cl. ............................ G01n 31/00
[58] Field of Search .......... 73/23, 27 R, 421.5 R; 23/254 R, 254 E, 255 E; 128/2.08

[56] References Cited
UNITED STATES PATENTS

| | | | |
|---|---|---|---|
| 2,484,217 | 10/1949 | Gardenier | 73/23 X |
| 2,824,789 | 2/1958 | Borkenstein | 23/254 R |
| 2,926,520 | 3/1960 | Schmauch | 73/27 R |
| 3,106,088 | 10/1963 | Kieselbach | 73/27 R |
| 3,476,516 | 11/1969 | Curry | 23/254 R |
| 3,552,930 | 1/1971 | Borkenstein | 23/254 R |
| 3,676,820 | 7/1972 | Taguchi | 23/254 E X |

Primary Examiner—Richard C. Queisser
Assistant Examiner—Stephen A. Kreitman
Attorney, Agent, or Firm—James J. Jennings, Jr.

[57] ABSTRACT

A breath tester system and control system therefor are disclosed. The tester includes a chamber in which a breath sample is stored, a detector unit positioned to test breath therein and means for shielding the detector unit from the chamber while breath is flowing into the chamber and for unshielding the detector unit thereafter to present a relatively quiescent breath sample to the detector. A purge pump for purging the system with air is provided and controlled.

6 Claims, 14 Drawing Figures

QUIESCENT BREATH TESTING SYSTEM

The present invention relates to an improved apparatus for determining alcohol concentrations and is especially concerned with an improved apparatus for detecting with greater accuracy the alcohol level of a human breath sample so that the subject's alcohol intoxication or non-intoxication may be effectively determined and demonstrated.

CROSS REFERENCE TO APPLICATIONS

The present invention is an improvement on and/or a co-development with the inventive breath testers described and claimed in the following copending U.S. patent applications, all of which are assigned to the assignee of the present application:

| Serial No. | Filing Date | Title | Inventor(s) |
|---|---|---|---|
| 136,921 | 4/23/71 | BREATH TESTING SYSTEM | D. W. Collier, J. P. Hoppesch and A. C. Mamo |
| 136,778 | 4/23/71 | BREATH TESTING SYSTEM | D. W. Collier, J. P. Hoppesch and A. C. Mamo |
| 154,381 | 6/18/71 | BREATH TESTING SYSTEM WITH BREATH TEMPERATURE VARIANCE COMPENSATION | J. E. Murphy |
| 107,407 | 11/10/71 | METHOD AND APPARATUS FOR OBTAINING ACCURATE READOUT OF BREATH TESTERS | K. W. Padgitt and D. H. Ward |
| 187,724 | 10/8/71 | BREATH INPUT UNIT FOR VEHICLE BREATH TESTING SYSTEM | S. Shiber and J. P. Hoppesch |
| 181,805 | 9/20/71 | BREATH TESTER NULL MEMORY SYSTEM | J. P. Hoppesch, D. H. Ward and J. R. Tomashek |
| 197,408 | 11/10/71 | BREATH INPUT HAND UNIT FOR BREATH TESTER | J. P. Hoppesch and A. C. Mamo |
| 280,927 | 8/15/72 | J-2 BREATH TESTER | J. P. Hoppesch and S. A. Schubert |

Filed at the same time herewith is the following application which is also assigned to the same assignee as is the present application: CONTROL SYSTEM FOR QUIESCENT BREATH TESTER, Inventors: Joseph P. Hoppesch, Kenneth W. Padgitt and Donald H. Ward, Ser. No. 313,891 (072005-BWL).

BACKGROUND OF THE INVENTION

The general background of this invention may be had by reference to the discussion of this topic in the above identified applications and especially in the first named application. Generally, the present invention relates to an improvement in the apparatus there described.

SUMMARY OF THE INVENTION

An improved breath testing system in accordance with the present invention includes means (such as a controlled recess cell) for receiving and holding a breath sample from a continuous flow of breath sample, for a period long enough to allow it to achieve an essentially quiescent state and means, including a sensor element and shielding therefor for deriving an electric output signal indicative of the alcohol concentration of only the sample only after it has reached the essentially quiescent state.

Additional features of the present invention which are believed to be novel are set forth hereinafter. The invention, together with the further advantages thereof, may best be understood by reference to the following description taken in connection with the accompanying drawings, in the several figures of which like reference numerals identify like elements.

DESCRIPTION

Figure 1:
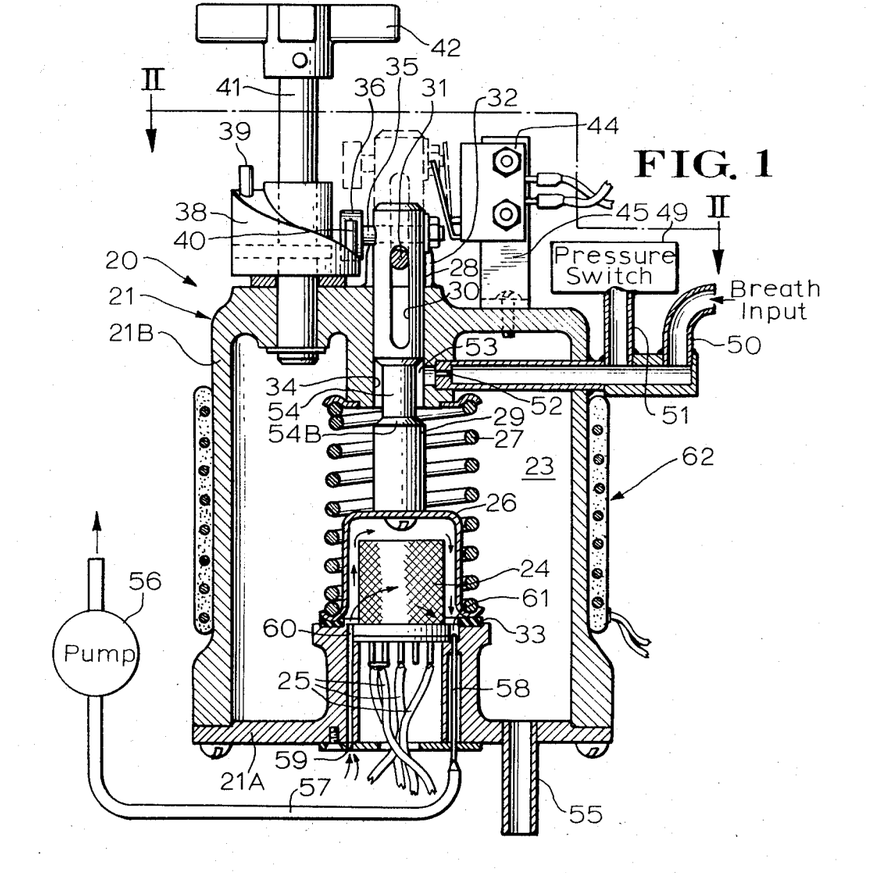
FIG. 1 is an elevational view in section, with the moved position of some parts shown in phantom lines, of a cell constructed in accordance with the point for achieving a quiescent breath sample, this cell is part of a breath sampling system constructed in accordance with the present invention.
Figure 2:
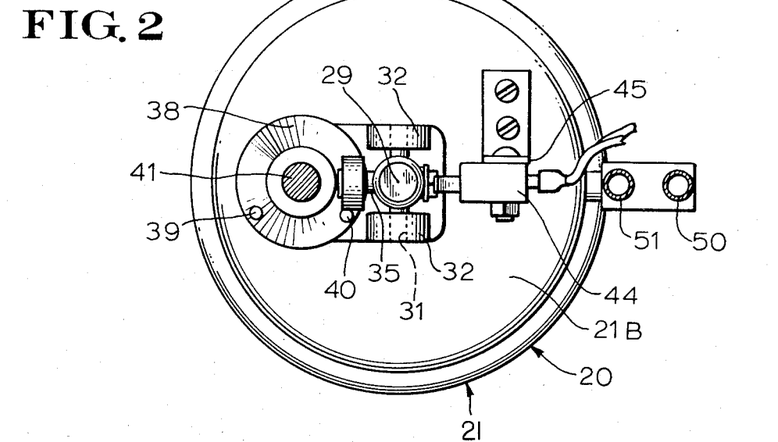
FIG. 2 is a top view, partly in section, of the cell of FIG. 1 taken along line II—II.

Referring to the Figures and especially FIG. 1, there is depicted a quiescent sampling unit or cell 20 constructed in accordance with the present invention. The particular cell 20 (as can be better seen by referring to FIG. 2) has a generally hollow cylinder body 21 including disc shaped base 21A (FIG. 1) affixed to a cylindrical shaped housing 21B (FIG. 2). Together the housing 21B and base 21A define a breath holding chamber 23.

Mounted within the chamber 23 at the approximate center thereof is a detector unit 24 which has its output terminals connected by leads 25 which extend without the body 21.

In accordance with a major feature of the invention, the detector 24 is shielded from the main part of the chamber 23 by a relatively movable shield or cover 26 which can be, in one position and as shown, in a closed position. That is the cover 26 is held in an air tight seal against a seal washer or ring 33. The cover 26, when closed, defines a small volume about the sensor unit 24. The shield or cover 26 is attached to a shaft 29 which passes up through a bore 34 formed in the top of the housing 21B. The upper part of the shaft 29 extends above the housing 21B and has a vertical guide slot 30 into which a horizontal guide pin 31 is positioned. As better seen in FIG. 2, the pin 31 is affixed between a pair of upstanding standards 32.

The shaft 29 is vertically movable between the position shown in full lines in FIG. 1 and a moved position shown in phantom lines in that figure by means of a lifting mechanism which, in this embodiment, includes a horizontal axle pin 35 affixed near the top of the shaft 29 and an outrigger roller wheel 36 journaled thereon. The wheel 36 rests on a ramp portion of a cam 38 which is keyed to a manual handle shaft 41 and turns in response to the manual rotation of a handle 42.

A pair of stops 39 and 40 are positioned to bear against the wheel 36 in its highest and lowest positions.

Thus, by rotating the handle 42 and its keyed cam 38 the wheel 36 and attached shaft 29 are moved vertically between the two positions depicted. In the lower position the shaft-carried cover 26 covers or shields the detector unit 24. When the shaft 29 is raised to the upper position, the cover 26 is raised to uncover the detector and expose it to any gas or vapor in the chamber 23. The lowered and raised positions of cover 26 are sometimes referred to herein as the "closed" and "open" cell conditions or positions.

To ensure a good seal in the "closed" position, a coil spring 27 may be provided for urging the cover downward against the seal ring or washer 33. (For reasons to be explained below, the raising of the shaft 29 to its upper position also operates a microswitch 44 to provide a "cell open" signal.)

The cell 20 is provided with a breath input 50, which is in communication with a pressure line 51 (coupled, in turn, to a pressure switch 49) and through a pressure maintaining orifice 52 to a valve passageway 53 into the chamber 23. The passageway 53 is defined by a narrow "waist" segment 54 of the shaft 29 and the bore 34.

When the shaft 29 is raised upward the passageway 53 to the chamber is closed off when the larger diameter section 54B reaches and enters the bottom of the bore 34.

An exit 55 is provided for the chamber 23 at its bottom. The exit 55 also serves as a drain for any liquids deposited in the chamber 23.

A purge pump 56 is connected via tube 57 and a needle tube 58, to one side of the detector 24 under and within the closed cover 26. An air inlet port 59 is provided for admitting purging air to a point 60 on the other side of the unit 24 under the closed cover 26. When operated, the purge pump 56 serves to draw gas from the tube 57, needle 58 and the volume around the detector unit 24 (between it and the cover 26) and to draw ambient air through the port 59 to opening 60, as shown by the arrows in FIG. 1.

About the housing 21 is a "blanket" electrical heater and a temperature sensing thermistor combination designated 62 for keeping the cell 20 at a desired related operating temperature.

Figure 3:
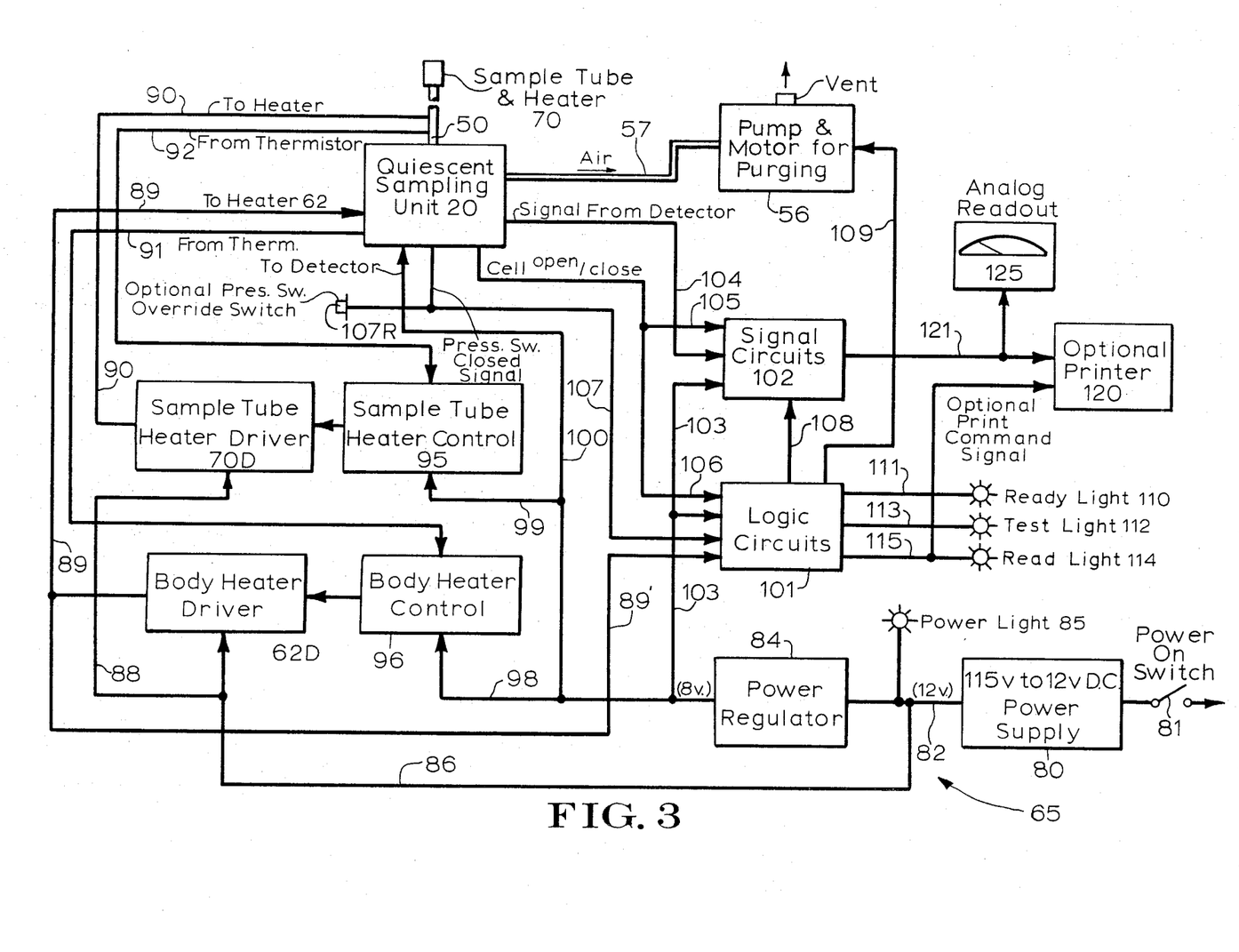
FIG. 3 is a block diagram of the overall system of which the cell of FIGS. 1 and 2 forms an important part.

The entire breath testing system of the present invention is depicted in FIG. 3 and is generally designated 65. A sample tube and heater 70 are there depicted connected to the input 50. This unit 70 may be identical to that described in the aforementioned Collier et al. applications.

In addition to the cell 20 the system 65 includes a power supply which may be connected through a master control switch 81 to a source of electric power, e.g. 115 volt A.C. power lines. (Of course, other power inputs, such as batteries, could be employed.) The output of the supply 80 is a convenient D.C. voltage (such as 12 volt D.C.) and serves as indicated by the output line 82 to supply such voltage to a voltage or power regulator 84, an indicating light 85 and, over line 86 to a driver circuit 62D. Power is also supplied over line 86 and line 88 to the sample tube driver circuit 70D.

These two heater drivers 62D and 70D supply power to the heaters of the sampling unit 20 and the tube and heater unit 50 as indicated by the lines 89 and 90, respectively. Thermistors or similar temperature sensors are associated with each of these units to provide signals indicative of their temperature, these signals are fed, as indicated by the line 91 and 92, to respective control circuits 95 and 96 which serve to control the drivers 70D and 62D respectively to cause the units 70 and 20 to reach and be maintained at desired preselected operating temperature ranges.

The regulator 84 supplies regulated voltage to the controls 95 and 96 (over lines 98 and 99) and also supplies power (line 100) to the detector of unit 50, logic circuits 101 and signal circuits 102 over line 103. The detector output signal is fed via line 104 to the signal circuits 102 and the signal from the microswitch 44 (FIGS. 1 and 2), which gives information as to the state (open or closed) of the cell 20 is also fed (as indicated by line 106) to the logic circuits 101. In addition, the pressure switch 49 supplies, over line 107, the logic unit 101 with information as to whether or not the sufficient pressure is present at the input unit or sample tube 70. (An optional manual override switch 107R may be provided to provide the same information to the logic 101.) The logic unit 101 serves to control the signal circuits 102 (as indicated by line 108) the pump 56 (line 109) a ready indicator light 110 (as indicated by line 111) a test indicator light 112 (line 113) and a read light 114 (line 115). This later command signal can also be used, as detailed below, to control an optional printer 120 for recording the output fed (line 121) to it from the signal unit 102. The output signal is fed to an analog readout device 125 such a meter calibrated to read in blood alcohol equivalents.

OVERVIEW OF OPERATION

Figure 4:
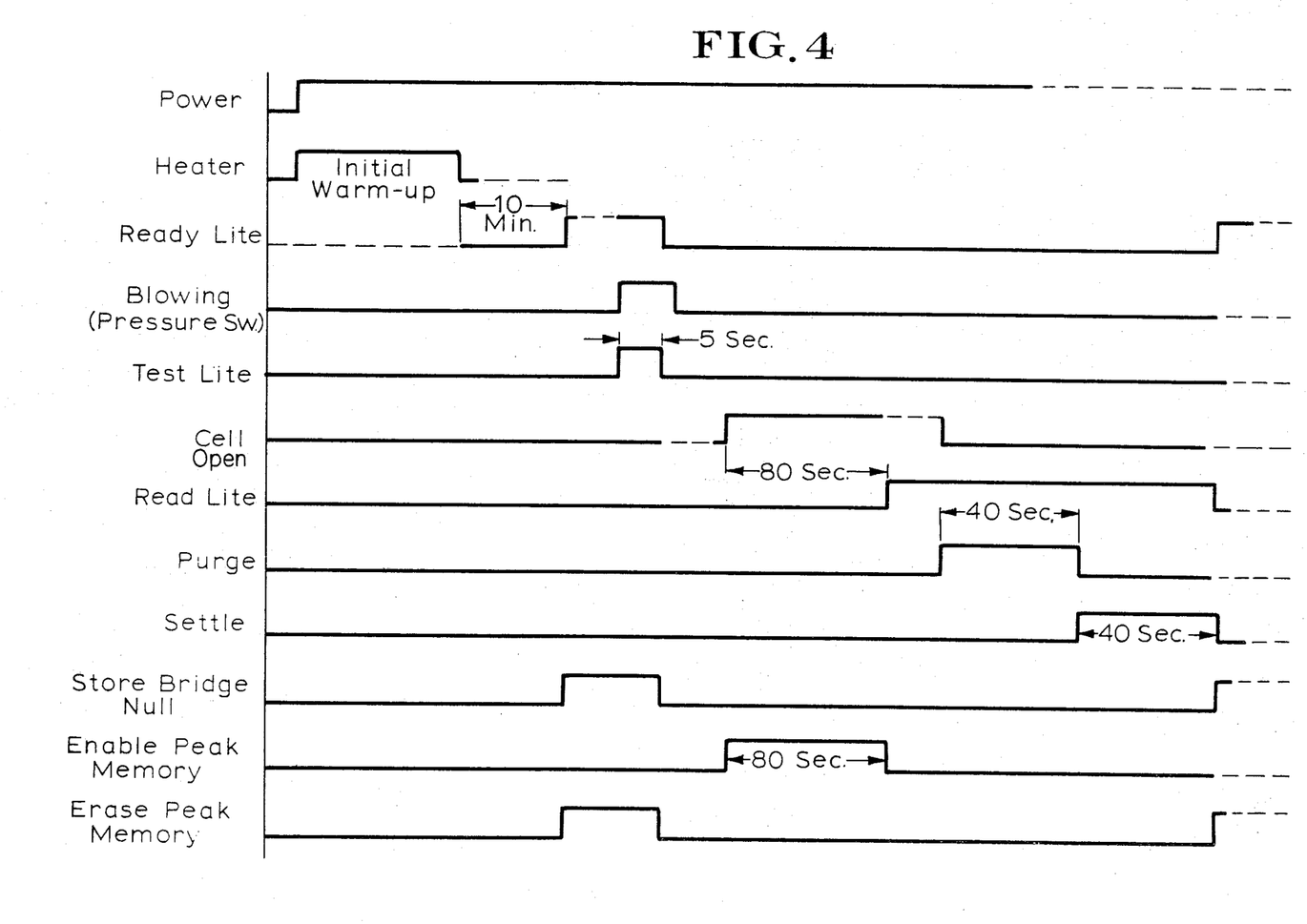
FIG. 4 is a timing diagram useful in understanding the operation of the system of FIGS. 1-3.

The overall operation of the system 65 may perhaps be best understood by following the timing sequence of a typical operating sequence with the aid of the timing diagram of FIG. 4.

Assuming the system to be initially unenergized (but connected to power — plugged in) with the cell as shown in FIG. 1 and as yet unused, the operator would begin by turning on the switch 81. This supplies power to the supply 80 and results in the presence of voltage on line 82, lighting the "power light" indicator 85. Power is also supplied to the heater drivers 62D and 70D, which in turn begin to drive the heaters over lines 89 and 90. (It being understood that the sampling tube and unit 20 would, after being idle for a period, be below their operating temperatures). Switching on of the power has also supplied voltage to the regulator 84 and then the heater controls 95 and 96, the detector 24 of the unit 20, the logic and signal circuits 101 and 102.

The heater driver 62D is used to provide the "warmed up" signal as its initial turn-off signal is fed via line 89' to the logic circuit 101. When this occurs a timer is started and after a suitable (e.g. 10 minutes) delay (to ensure that all elements of the system have reached proper operating temperatures) the ready light 110 is automatically lighted. At the same time a null or reference signal for the test is stored and the last breath signals erased (as will be explained in detail later).

At this time (or any time thereafter as is convenient) the operator may instruct a subject to start the test by blowing into the sample tube. When this occurs the pressure switch closes and signals (over line 107) this event to the logic circuits 101. The logic 101 employs this signal to light the test light and start a timer, which after a suitable short period of e.g. 5 seconds of essentially uninterrupted blowing, turns out the ready and test light.

At this time the subject may stop blowing. Then a lung breath sample is present which is stored in the chamber 23 (FIG. 1) and the null signal is held in a memory circuit.

The operator now turns the handle 42 cutting off the input 50, 52, 53 to the chamber 23 and exposing the detector 24. (This event is signaled by the microswitch 44 over line 106 and the logic 101, which starts a timer and signals over 108, the circuits 102, to accept the output of the detector 24.) After a predetermined delay (e.g. 80 seconds), the relative output of the detector is displayed and the read light 114 is lit. This relative output is the actual output of the detector compared with the null memory signal and is displayed at meter 125 or presented by an optional printer 120 (or used in some equivalent output apparatus).

For a second test, the operator needs to close the cell. This is signaled by microswitch 44 to logic 101 which activates the purge pump 56 to pump air through and over the covered detector unit 24 for a preset period (e.g. 40 seconds). At the end of this period the purge pump is stopped and a "settling" period (e.g. 40 seconds) timed out. At the end of this period the read light is extinguished, the stored peak memory signal of the previous breath test is erased, a new null signal is taken and stored and the ready light is turned on. From this point, the operation can be repeated for as many samples as desired.

DETAILED DESCRIPTION

Figure 5:
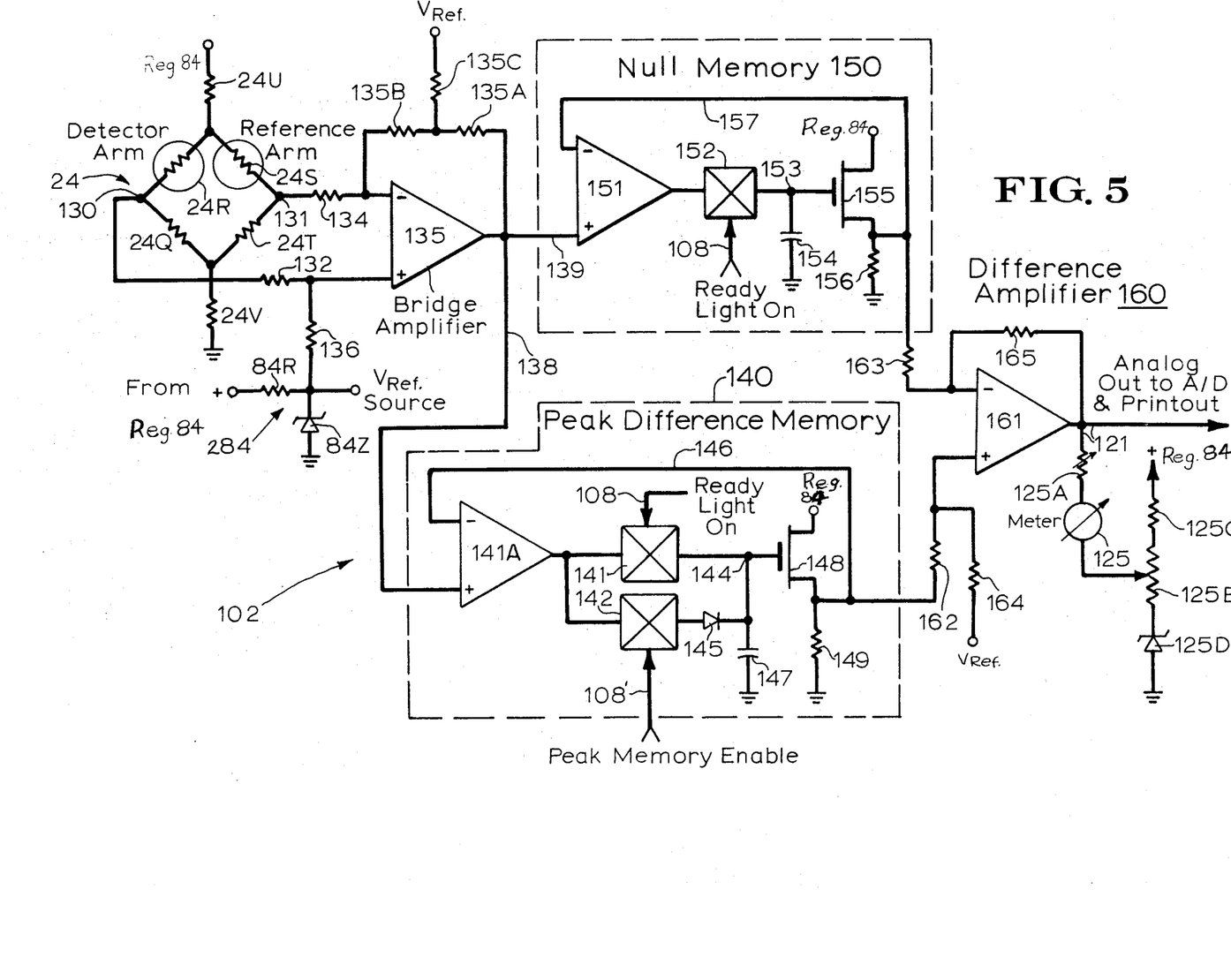
FIG. 5 is a schematic circuit diagram detailing a portion (the null memory portion) of the system of FIG. 3.

Having given the overall description and operation the system will be described in more detail. In FIG. 5 the signal circuit 102 and some of the associated elements are depicted in more detail. The detector 24 includes a resistance 24R whose value varies with the alcohol to which the detector 24 is exposed. The resistor 24R is part of a bridge circuit, which bridge includes resistors 24S, 24T and 24Q. Resistors 24R and 24S have one end connected together and that end connected through a resistor 24U to the regulated voltage source. The other ends of resistors 24R and 24S are connected to, respectively, output terminals 130, 131 and to one end of resistors 24Q and 24T. The other ends of these latter resistors are connected together and through a resistor 24V to ground.

The terminals 130, 131 are respectively connected through resistors 132, 134 to the primary positive and negative inputs of an operational amplifier 135. The positive primary input of amplifier 135 is also connected through a resistor 136 to the reference voltage source 284. This source 284 comprises a zener diode 84Z whose cathode-anode circuit is connected between its output and ground and a resistor 84R connected between the cathode of diode 84Z and the regulator 84.

The amplifier 135 includes a feedback circuit to its negative primary input comprising series connected resistors 135A and 135B whose junction is connected, through a resistor 135C to $V_{Ref.}$. The output of the bridge signal amplifier 135 is connected, via a line 138, to a peak difference memory circuit 140 and, via a line 139 to a Null Memory Circuit 150.

The peak difference memory circuit 140 includes an operational amplifier 141A whose positive primary input is connected to line 138 and whose output is connected to the inputs of two analog transmission gates 141, 142 which serve to block and transmit its output in response to the absence or presence of a signal (respectively 108 and 108') from the logic circuits. These signals are respectively the ready light "on" signal (line 108) and the peak memory enable signal (line 108'). The output of the gate 141 is connected to a junction point 144 and the output of gate 142 is connected through the anode-cathode circuit of a diode 145 to that point 144. Point 144 is also connected through a holding capacitor 147 to ground and to the gate of an MOSFET 148. The drain of MOSFET 148 is connected to regulator 84 and its source is connected through a resistor 149 to ground, through a feedback line 146 to the negative primary input of operational amplifier 141A and to a difference amplifier circuit 160.

The Null Memory circuit 150 comprises an operational amplifier 151 whose positive primary input is line 139 and whose output is connected to an analog transmission gate 152, which responds to the ready light "on" signal 108 to transmit the amplifier output to a terminal 153. The terminal 153 is connected through a holding capacitor 154 to ground and to the gate of a MOSFET 155. The MOSFET 155 has its drain connected to regulator 84 and its source connected through a resistor 156 to ground, through feedback line 157 to the negative primary input of operational amplifier 151 and to the difference amplifier circuit 160.

The difference amplifier 160 includes an operational amplifier 161 whose positive primary input is connected (through a resistor 162) to the output of the Peak Difference Memory Circuit 140, and whose negative primary input is connected (through a resistor 163) to the output of the Null Memory Circuit 150. The positive input is also connected through a resistor 164 to $V_{Ref.}$. The negative input is connected through feedback resistor 165 to the output of the amplifier 161. This output is the line 121 which may be coupled to the printer 120 (if used) and through a calibrating resistor 125A to the meter 125 whose other side is connected to the top of a potentiometer 125B. The other ends of potentiometer 125B are connected through a resistor 125C to a source of voltage and through the cathode-anode circuit of a zener diode 125D to ground.

In operation the circuits of FIG. 5 serve to (in response to logic signals on 108, 108'), store a nulling signal in the memory 150 immediately prior to a test and to store the peak signal output of the detector 24 during the test period in the peak difference memory 140. The difference between these stored signals is amplified by the difference amplifier 160 and fed to the output apparatus (e.g. meter 125) via lines 121.

In more detail and with reference also the timing diagram of FIG. 4 in the normal sequence of operation after the initial warm up and extra settling delay, the ready signal (that lights the ready light) is "on" (e.g. goes to +8v, or in Boolean logic terms goes from 0 to 1, although, of course, as is well known, any other equivalent signal arrangement may be employed to the same effect). When this event is signaled, the gates 141 and 152 are "opened" (the signal may pass). This results in the amplified output of the detector 24 is fed to the null memory 150. It is also fed to the peak difference memory 140 and the charge stored on the capacitor 147 tracks that of capacitor 154. (This also allows capacitor 147 to discharge any stored signal thereon through the transmission gas 141.)

When the ready light goes out, the gates 141 and 152 are "closed" storing the amplified detector voltage on both capacitors 154 and 147. When the cell is opened to expose the quiescent sample to the detector 24, the microswitch 44 signal initiates the peak memory enable signal for the preset (e.g. 80 second) period. This signal is fed over line 108' to gate 142 which opens to pass the amplified detector output through diode 145 to capacitor 147. The diode 145 serves to feed any voltage level above that already stored on capacitor 147 to it and, preventing any discharge, to hold that peak voltage thereon. During this period the difference between the voltages stored on the capacitors 154 and 147 is amplified in difference amplifier 160 and fed to the output apparatus meter 125. At the end of the preset period the gate 142 is closed, a final reading is obtained, and the read light is lighted. For the next test the process is repeated.

Figures 6, 7:
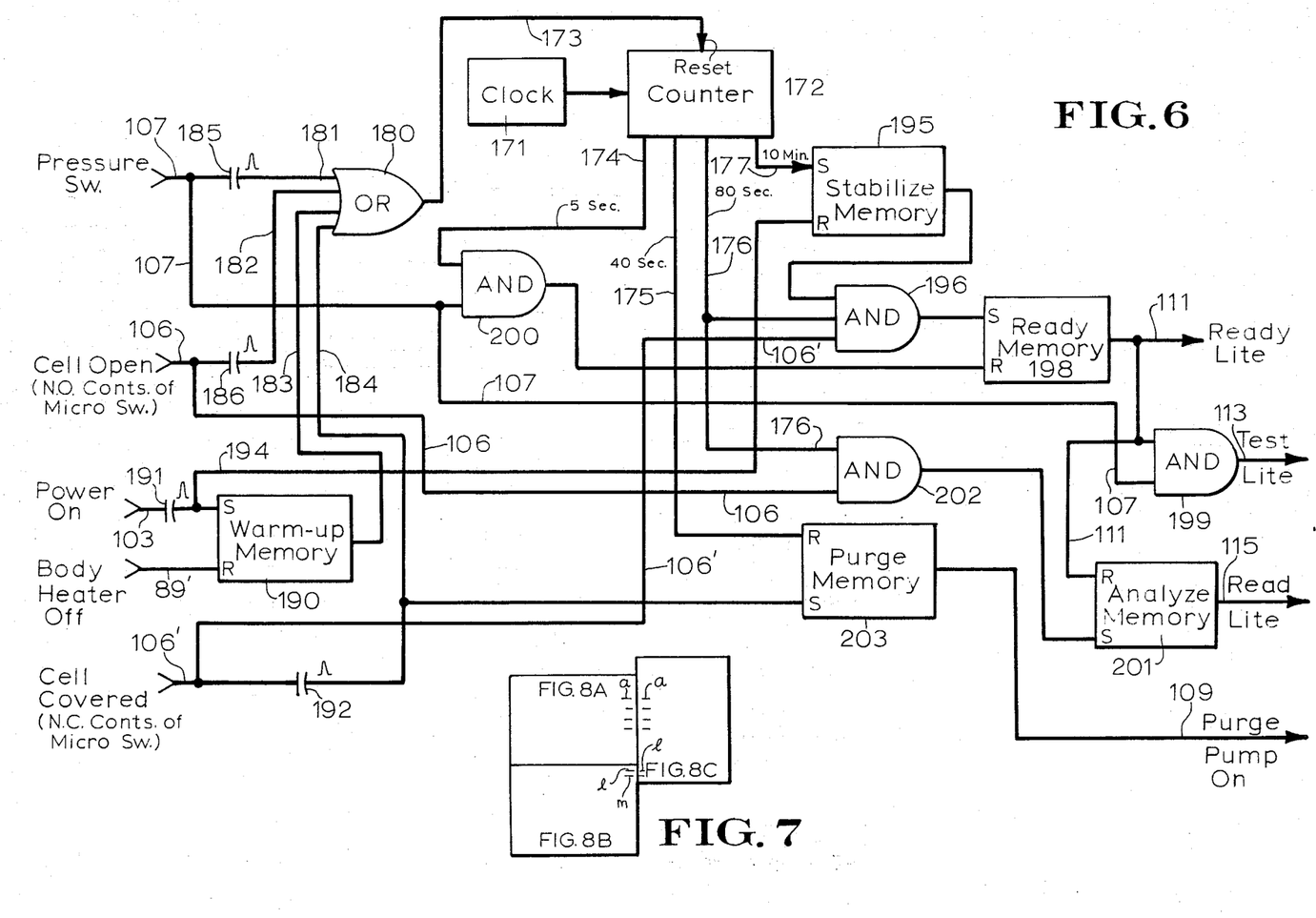
FIG. 6 is a schematic logic and circuit diagram illustrating the operation and construction of the logic portion of the system of FIG. 3.
FIG. 7 is a lay-out diagram illustrating the juxtaposition of the three sheets labeled FIGS. 8A, 8B and 8C.

In FIG. 6 there is depicted the logic circuit unit 101. The logic unit has five information signal inputs two of which, lines 106 and 106', are derived from the microswitch 44. The line 106 is connected to the normally open switch contacts of microswitch 44 resulting in a positive voltage only when the shaft 29 (FIGS. 1 and 2) reaches its top position and closes these switch contacts. The line 106' is connected to the normally closed contacts and presents a positive voltage except when the shaft 29 rises to cover or open the cell and operates the microswitch 44.

The other three inputs to the logic unit 101 are from the pressure switch line 107 which provides a continuous positive voltage when sufficient pressure is sensed and disconnects that signal when the pressure is insufficient; from the power line 103 and the body heater on line 89'. (This latter is a positive voltage taken as a logical "1" whenever the body heater 62 is turned "off" and a logical "0" when it is "on".)

From these five inputs the logic unit responds to produce four control signals in accordance with the operation previously explained in conjunction with FIG. 4. To do this, the logic unit 101 employs a timer that includes a clock 171 that drives a resettable counter 172. The counter 172, unless reset on an input on a line 173, produces output signals on a line 174 every 5 seconds, on a line 175 every 40 seconds, on a line 176 every 80 seconds and on a line 177 every 10 minutes. The counter is reset by the output of an OR gate 180 which has four inputs. These are lines 181, 182, 183 and 184. A positive pulse on any of these lines thus will reset the counter 172. The line 181 is connected through a capacitor 185 to the pressure switch. The capacitor 185 causes a positive pulse to be produced whenever the pressure switch is closed and the signal on line 107 goes to a positive value. The capacitor 185 serves to deliver only a pulse. The input 182 is similarly derived through a capacitor from the input 106. That is, a positive pulse results on line 182 from the opening of the cell 20 by turning the handle 42 (FIG. 1).

The input on line 183 is derived from a warm-up memory 190 (Flip Flop) which is set by a pulse derived by a capacitor 191 from power line 103. This pulse results from the turning on of the power supply and results in line 183 having an output to keep the counter 172 reset until the memory is reset by a "1" input on line 89'. This occurs when the body heater initially cycles off for the first time (indicating that the cell 20 is up to operating temperature).

The final input 184 to the OR gate 180 is a pulse derived from a capacitor 192 connected to the n.c. contacts of microswitch 44 (FIGS. 1 and 2). This pulse results from the closing of the cell 20 after it has been opened for a time.

In addition to setting the warm-up memory 190, the turning on of the power couples a pulse over a line 194 to reset a stabilizer memory unit (Flip Flop) 195 which unit is set by the 10 minute signal on line 177. The output of the memory 195 is fed to an AND gate 196. The gate 196 has two other inputs, the 80 second line 176 and the cells covered line 106'. Thus, when the cell is covered, and the 80 second signal is present, and the unit 195 is not reset, and only then, will there be an output from the AND gate 196. Its output serves to set a Flip Flop 198 which is a read memory print and, when set, operates the ready light over line 111.

The output of unit 198 also serves as an input to an AND gate 199 whose only other input is the line 107 from the pressure switch. Thus, only when both these signals are present will an output be present from the gate 199. This output is the line 113 to the test light.

The line 107 also serves as an input to another AND gate 200 whose only other input is the 5 second signal on line 174. The output of AND 200 is to the reset terminal of the unit 198 whose output, so mentioned above, is the line 111. In addition to operating the ready light, the output of line 111 is used to reset an analyze memory Flip Flop 201 whose set input is the output of an AND gate 202 and whose output is the line 115 to the read light.

In addition the logic circuit unit 101 includes a purge memory Flip Flop 203 whose set input is connected to the line 184, whose reset input is the 40 second line 175 and whose output is the line 109.

Having explained the operational logic of FIG. 6 reference may be had to FIGS. 7, 8A, 8B and 8C for one presently preferred circuit for achieving the operation of FIG. 6. FIG. 7 details the arrangement of FIGS. 8A, 8B and 8C, it being indicated that the lines designated as through one are continued between the sheets of drawings. This circuit is set out to ensure that applicant's best mode is set out herein. For brevity, this circuit and its detailed operation will not be detailed here as it is but one mode achieving the desired control logic.

For completeness of this disclosure, the component values of this circuit are set out below. The values of the resistors and capacitors are placed on the drawings as well as the interconnection of the below set out components.

| Component | Number | Manufacturer |
|---|---|---|
| Transistor 250 | MPS 6514 | Motorola |
| Transistor 251 | MJE 2955 | Motorola |
| Solid State Device 252 | MFC 6030 | Motorola |
| Diode 253 | FJT 1000 | Fairchild |
| MOSFETs 155, 148 | 2N3796 | Motorola |
| Transistors 254, 257, 259, 261 | MPS 6514 | Motorola |
| Transistor 255 | 2N4921 | Motorola |
| Diode 256 | 1N659 | Fairchild |

Integrated circuits are identified by a control number in the drawings. The terminals connected to 8v and ground are also identified in the table below. It should be understood that several logic units are present in many such integrated circuits.

| Number | Part | Mfd. | +8v | GND |
|---|---|---|---|---|
| 1 | CD4011A | RCA | 14 | 7 |
| 2 | CD4011A | RCA | 14 | 7 |
| 3 | CD4011A | RCA | 14 | 7 |
| 4 | CD4023A | RCA | 14 | 7 |
| 5 | CD4011A | RCA | 14 | 7 |
| 6 | CD4023A | RCA | 14 | 7 |
| 7 | CD4020A | RCA | 16 | 8 |
| 8 | CD4012A | RCA | 14 | 7 |
| 9 | CD4011A | RCA | 14 | 7 |
| 10 | CD4011A | RCA | 14 | 7 |
| 11 | CD4023A | RCA | 14 | 7 |
| 12 | CD4009A | RCA | 1, 16 | 8 |
| 13 | MC1741CL | Motorola | 11 | 6 |
| 14 | MC1741CL | Motorola | 11 | 6 |
| 15 | CD4016A | RCA | 14 | 7 |
| 16 | MC1741CL | Motorola | 11 | 6 |
| 17 | MC1741CL | Motorola | 11 | 6 |

Figure 8A:
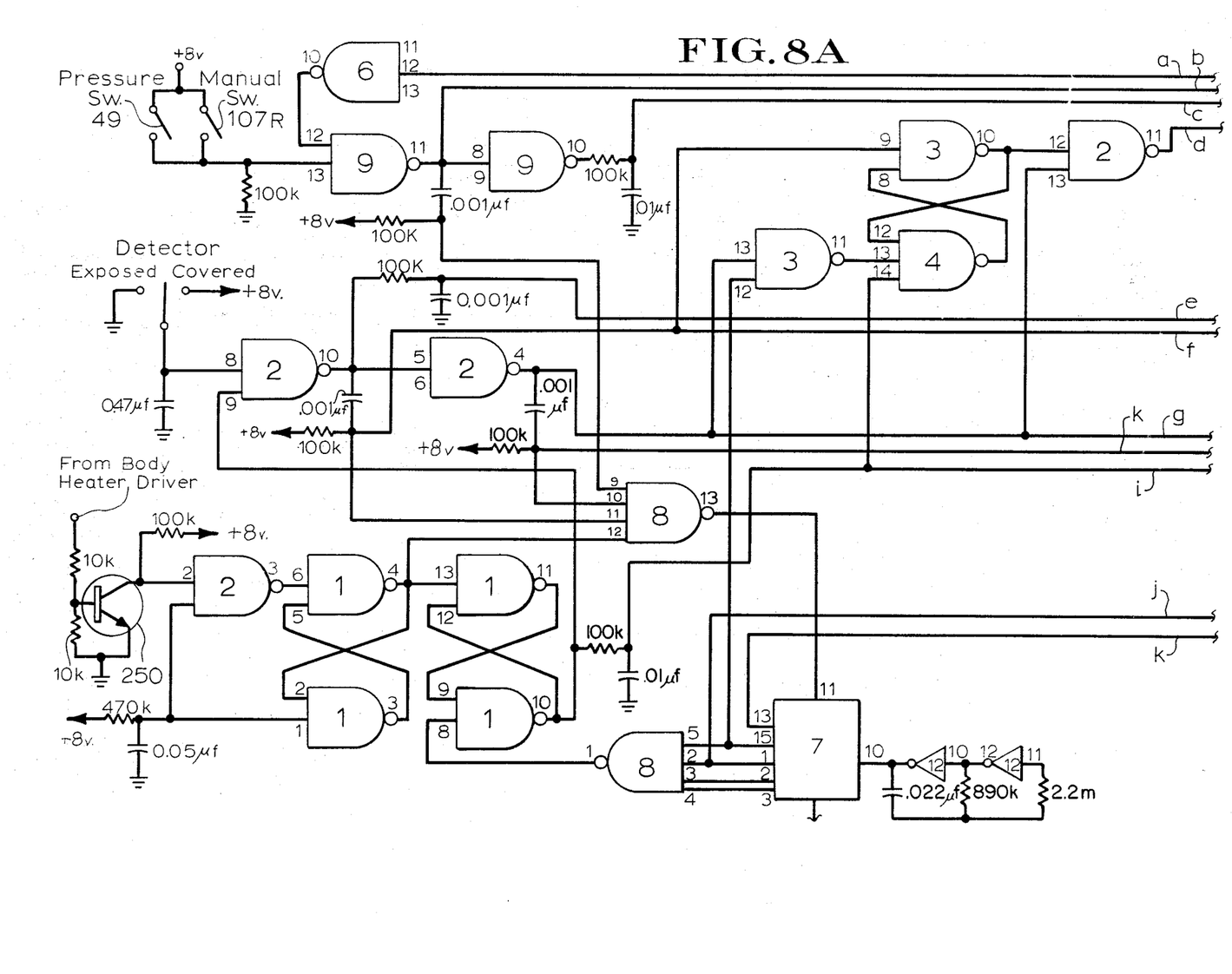
FIGS. 8A, 8B and 8C (comprising three parts on separate sheets positioned as illustrated in FIG. 7) are a detailed logic circuit diagram illustrating one preferred mode of making the logic portion of the system of FIG. 3.
Figure 8B:
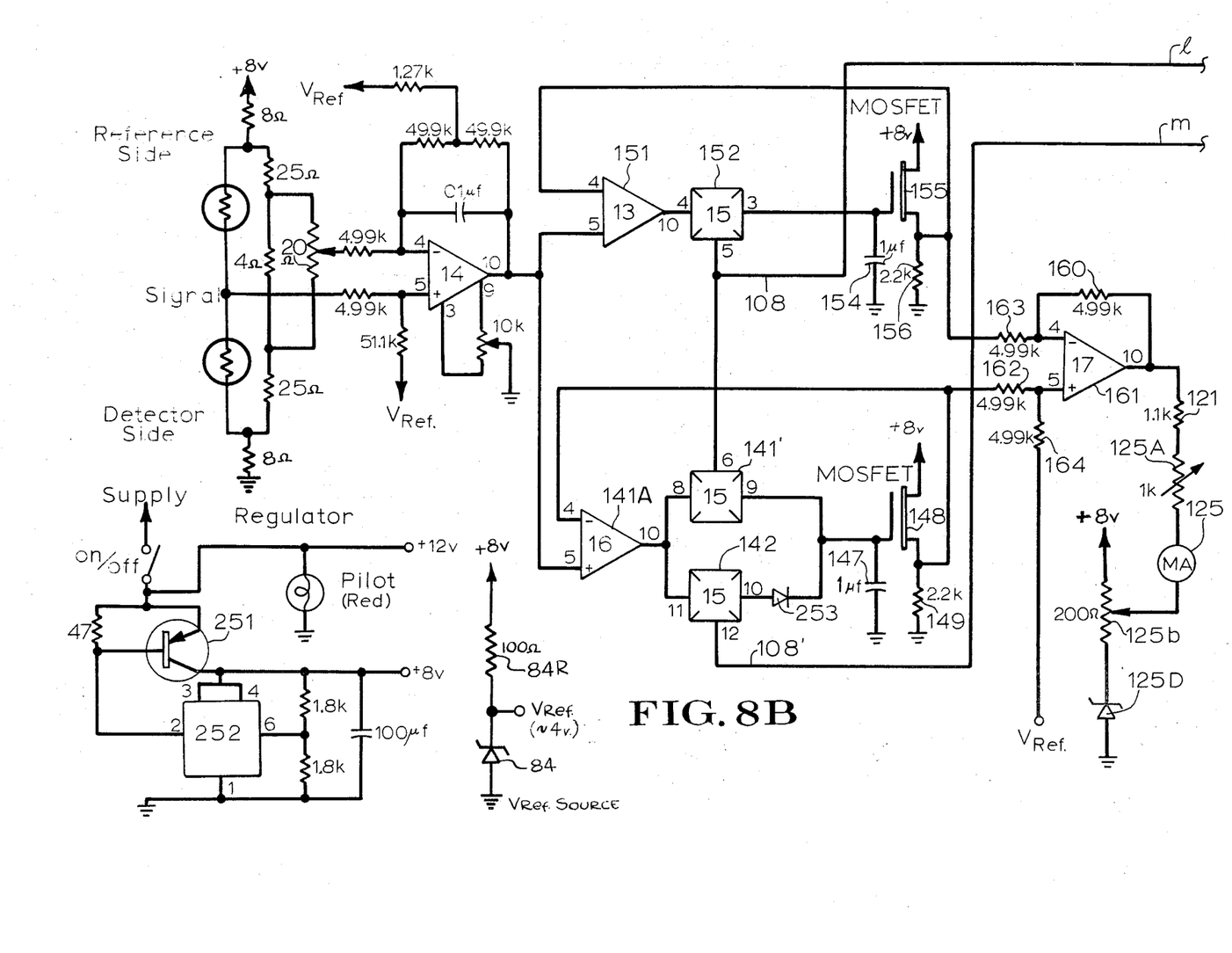
Figure 8C:
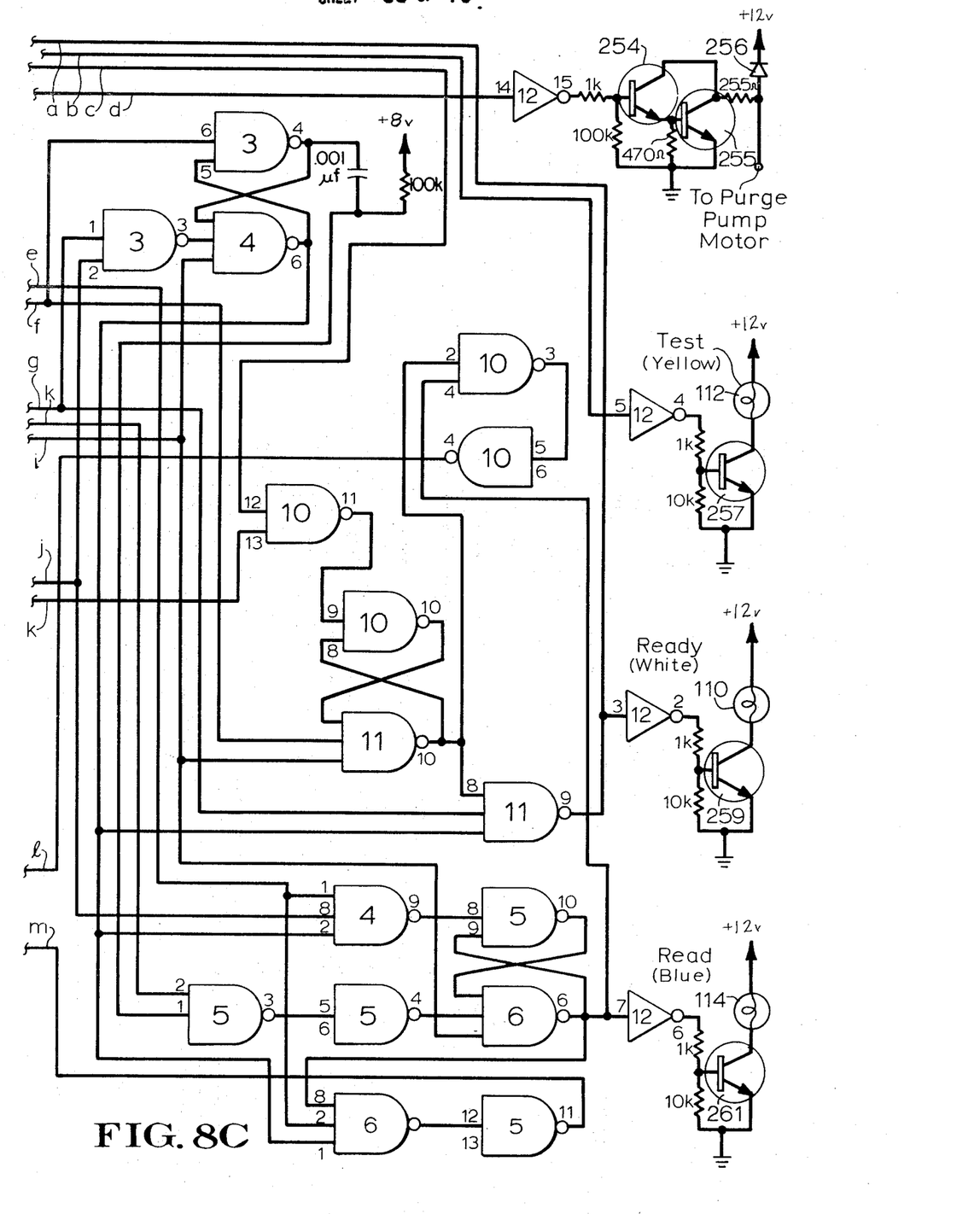

The above set out circuit 101 was actually constructed in accordance with FIGS. 8A, 8B and 8C and was successfully operated.

SECOND EMBODIMENT

Figure 9:
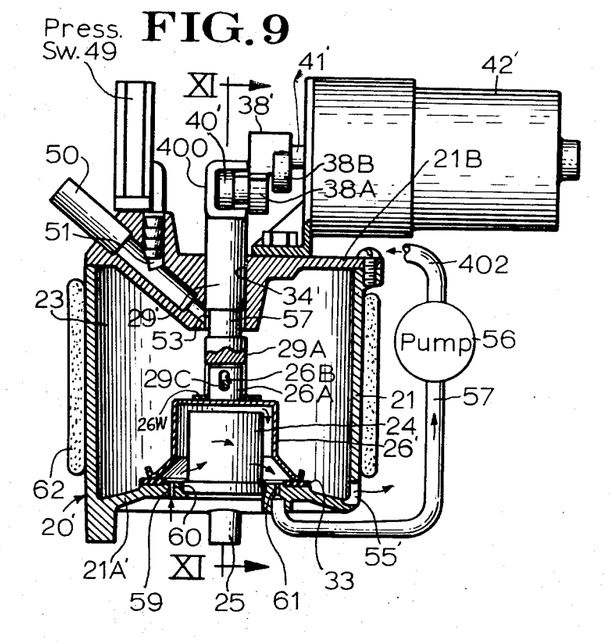
FIG. 9 is a side sectional view, similar to FIG. 1, of a modified second embodiment of the cell of FIGS. 1 and 2.

A second preferred embodiment of the invention is shown in FIGS. 9–12. Referring to FIG. 9 there is depicted an entirely automatic cell 20' which is generally similar to the cell 20 of FIGS. 1 and 2, but is modified somewhat in details of construction and operation. This cell 20' includes a cover 26' coupled to a shaft 29' by means including a central upstanding standard 26A fitted loosely in a stirrup 29A (FIGS. 9 and 10) formed by cutting a slot 29B in the bottom of the shaft. A horizontal pin 29C bridges the stirrup and passes through an oversized opening 26B in the standard 26A. This opening 26B is an elongated slot and serves as a lost-motion device for allowing the shaft 29' to rise for a distance without raising the cover 26'. This ensures that the passageway 53 is closed before the cover 26' is removed.

In this embodiment the shaft 29' is raised by means of a motor 42' which may include a reduction gearing to its output shaft 41'. Affixed to this shaft 41' is a cam member 38' which carries essentially a roller 40' which projects into a C-shaped horizontal channel 400. This channel 400 is affixed atop the shaft 29' and serves to allow the roller wheel 40' to travel freely horizontally but translates its vertical movement into a vertical force on the shaft 29'. Thus, in response to one revolution of the shaft 41', the roller will reciprocate the shaft 29' through its extreme vertical positions and return it to the starting position.

The cell 20' is depicted in its "closed" position with the roller 40' at its lowest point. At this point it bears down on the shaft 29' whose bottom surface meets and compresses a Belleville spring washer 26W which urges the cover 26' downward and ensures a good seal between the cover lower edge lip and a resilient seal 33.

The other major departure from the cell of FIGS. 1 and 2 is in additional purge provisions. In this embodiment the pump 56 serves not only to draw fresh air through the holes 59 and 60 (which are closer together here) through the under-cover exit 61 and tube 57, but also pumps the air from its high pressure outlet via a tube 402 to an inlet 404 (FIG. 10) into the chamber 23 to drive gases out of its vent 55' and purge that chamber 23 (all as indicated by the arrows in FIGS. 9 and 10).

Figure 11:
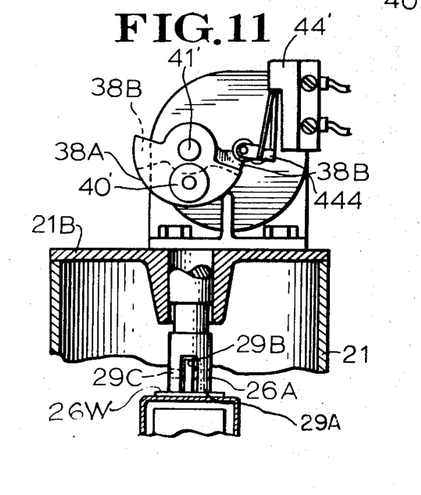
FIG. 11 is a partial sectional view of the cell of FIGS. 9 and 10 taken along the line XI—XI in FIG. 9.

The cam unit 38' includes two juxtaposed cam surfaces 38A and 38B. As best shown in FIG. 11, the surface of 38A is semicircular about the motor output shaft 41' and serves to operate or not operate a microswitch 44' corresponding to the microswitch 44 of the first embodiment. The second surface 38 has two diagonally opposite surface segments to operate a microswitch 444 only when the shaft 29' is in its top and its bottom positions. As will now be explained in connection with FIG. 12, this microswitch 444 serves to control the motor 42'.

Figure 10:
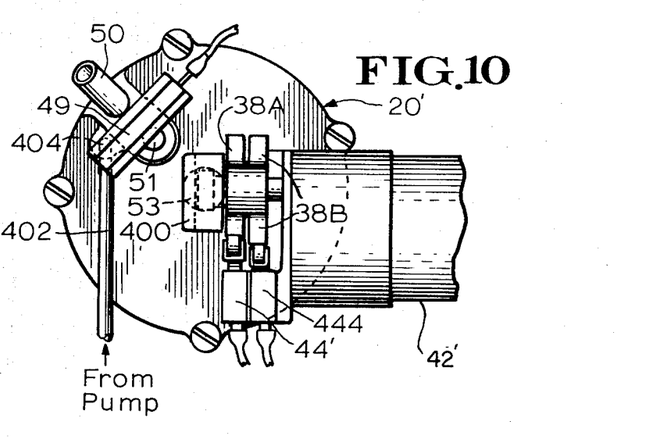
FIG. 10 is a top view of the cell of FIG. 9.
Figure 12:
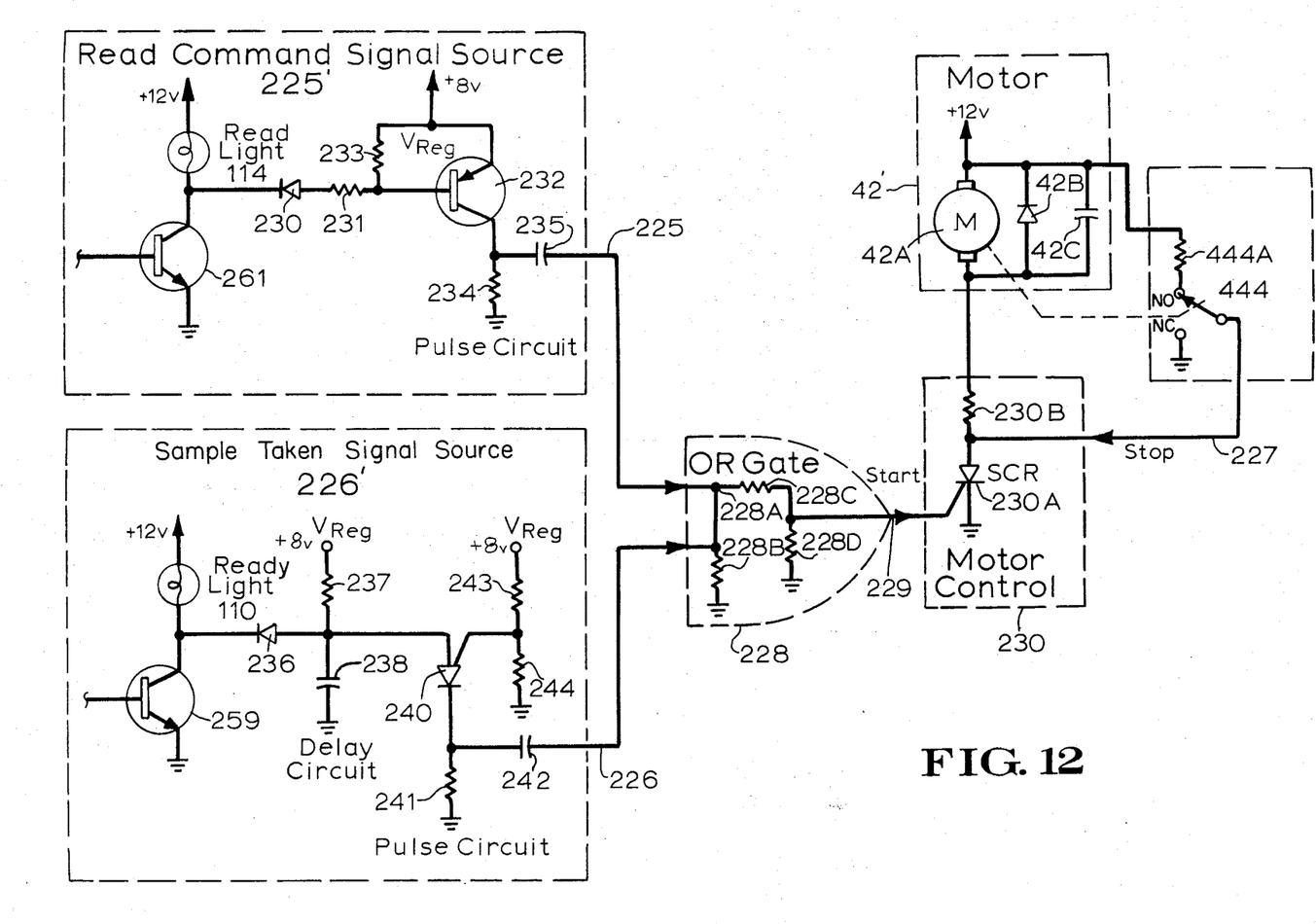
FIG. 12 is a circuit diagram of an addition to the logic and circuit diagram of FIGS. 8A, 8B and 8C, which addition adapts the logic of that circuit to the modified embodiment of the invention illustrated in FIGS. 9, 10 and 11.

In FIG. 12, the modification of the control circuit of FIG. 6 and FIGS. 8A, 8B and 8C for the embodiment of FIGS. 9 and 10 is depicted. It should be understood that the remainder of the circuitry and system may be unchanged. Three informational inputs are employed in FIG. 12 a read command signal, on line 225, a delayed sample taken signal, on line 226, and a motor stop signal, on line 227, derived from the microswitch are combined in an OR gate 228 to produce a start signal on line 229 which is fed to a motor control 230 for starting the motor. The stop signal on line 227 serves to stop the motor.

OPERATION OF THE SECOND EMBODIMENT

In overall operation the second system achieves the same results as in the first system, but it eliminates the manual operation of the handle. In terms of the timing diagram of FIG. 4, the operation is identical except that the cell is automatically opened, a short period after the ready light 110 is turned off. The operation is such as to initially close the input port 53 (by the lost motion of 29A, 29B, 26A, 26B) to prevent any input therefrom prior to the uncovering of the detector 24. Also at the end of the testing period (80 sec. in FIG. 4) the cell is automatically closed and the purge pump run for its cycle (e.g. 40 sec.). In this embodiment the purge pump also serves to purge the chamber 23 as well as the covered detector 24 of FIG. 9.

In more detail, the source 225' includes the read light driver 261 and read light 114 which remains as before except for the connection of the cathode of a diode 230 to their junction. The anode of diode 230 is connected through a resistor 231 to the base of a PNP transistor 232. This base is also connected through a resistor 233 to a source of positive potential (e.g. 8v). The emitter of transistor 232 is similarly connected to this bias voltage source while its collector is connected through a resistor 234 to reference potential or ground and also through a D.C. blocking capacitor 235 to line 225.

The source 226' similarly includes the transistor 259 and light 110 connected as before, but with the cathode of diode 236 connected to their junction. The anode of diode 236 is connected to the junctions between a series connected resistor 237 and capacitor 238 connected between a regulated positive potential and ground. This junction is also connected to the anode of a programmable unijunction transistor.

The cathode of the transistor 240 is connected through a resistor 241 to ground and through a capacitor 242 to line 226. The gate of transistor 240 is connected to the junction between a pair of series connected resistors 243, 244 which pair is connected between +8v and ground.

The OR gate 228 includes a simple connection 228A between lines 226 and a circuit including a resistor 228B from the junction to ground, a resistor 228C to line 229 and a resistor 228D from line 229 to ground.

The motor control 230 is an SCR 230A whose gate is connected to line 229, whose cathode is grounded and whose anode is connected to line 227 and through a resistor 230B to the motor 42'.

The switch 444 has its common terminal connected to line 227, its normally closed terminal grounded and its normally open terminal connected through a braking resistor 444A to the positive terminal of the motor.

The motor 42' includes a D.C. motor 42A having one terminal connected to positive potential (e.g. 12v) and its other terminal connected to the control circuit 230. A transcient protection network consisting of a diode 42B and a capacitor 42C is connected across the motor.

Breath testing systems have been constructed in accordance with the above descriptions and these systems when tested provided satisfactory results. The detector 24 used in these tested systems was a commercially available Bacharach, 800–080.2 detector.

While particular embodiments of the invention have been shown or described, it will be obvious to those skilled in this art that changes and modifications may be made without departing from the invention in its broader aspects. It is therefore the intent of the following claims to cover every form that the invention may assume including improved forms which may merit patents of their own, and those forms that differ in appearance from the form herein described.

We claim:

1. In a breath testing system of the type employing an alcohol sensor unit and having means for providing a breath sample for testing which sample is the result of a predetermined, essentially continuous and uninterrupted blowing of breath so that the sample obtained is suitable lung breath, the improvement comprising:
   means for receiving and holding the lung breath sample for a time period sufficient for the sample to achieve an essentially quiescent state; and
   means, including the sensor unit, for deriving an electrical output signal indicative of the alcohol concentration in the essentially quiescent sample, including means for shielding the sensor unit from the breath sample until it has achieved the essentially quiescent state and for thereafter unshielding the sensor unit for deriving the electrical output signal,
   whereby said sensor unit is protected from flow effects and from reacting to any but the suitable lung sample.

2. The invention of claim 1, wherein:
   said shielding means includes a shield element that is relatively movable between a first position that substantially covers said sensor unit and a second position wherein said sensor unit is uncovered.

3. The invention of claim 2, wherein said system includes an air pump for use in purging the sensor unit after it has tested a sample, and means, coupled to the air pump, for defining passageways to the volume under the shield element so that air may be pumped and circulated under the shield element and about the sensor unit.

4. A breath testing system which includes:
   a cell into which breath may flow;
   a breath alcohol sensing unit which reacts to alcohol vapor to produce an electrical output signal indicative of alcohol concentration,
   said sensing unit being mounted in proximity to said cell; and
   means, including a shield, for alternatively shielding or exposing the sensing unit to a breath sample in said cell,
   so that said sensing unit may be shielded from a breath sample while flowing into said cell and then be exposed to the sample after the sample is in a relatively quiescent state, so that the effects of flow are minimized and the resulting electrical output signal is more accurately indicative of the concentration of alcohol present.

5. The method of testing breath for alcohol content employing a detector and a holding cell, comprising the steps of:

causing a continuous and uninterrupted flow of breath to pass into the cell for a predetermined period while shielding the detector therefrom, stopping the flow of breath to the cell, and then, after a period of time sufficient to allow flow effects to diminish, exposing the detector to the breath in the cell and detecting the alcohol content of that breath.

6. A quiescent sampling unit (20) for use in a fluid tester comprising:

means (21) defining a chamber (23);

an inlet (50) for fluid to enter said chamber;

means (54B) for opening and closing said inlet;

a detector (24) mounted to be exposed to the chamber;

means (26) for shielding and not shielding said detector from the chamber; and means (29, 38, 41) for displacing said shielding means to cause said detector to be selectively shielded and unshielded and for coincidentally causing said inlet opening and closing means to open and close said inlet, so that said detector is substantially shielded from flow from said inlet.

* * * * *